No. 892,578. PATENTED JULY 7, 1908.
A. R. BYRKETT.
NUT LOCK.
APPLICATION FILED JUNE 22, 1906.

Witnesses

Inventor
A. R. Byrkett
Attorneys

UNITED STATES PATENT OFFICE.

AHIJAH R. BYRKETT, OF BINGEN, WASHINGTON.

NUT-LOCK.

No. 892,578.   Specification of Letters Patent.   Patented July 7, 1908.

Application filed June 22, 1906. Serial No. 322,893.

*To all whom it may concern:*

Be it known that I, AHIJAH R. BYRKETT, a citizen of the United States, residing at Bingen, in the county of Klickitat and State of Washington, have invented certain new and useful Improvements in Nut-Locks, of which the following is a specification.

My invention relates to nut locks, and has for its object to provide a simple, cheap, and effective lock which can be readily applied and used, and which allows of the nut being tightened at intervals; and to these ends my invention consists in a nut lock having the general features of construction and arrangement of parts, coöperating together substantially in the manner set forth.

Figure 1:
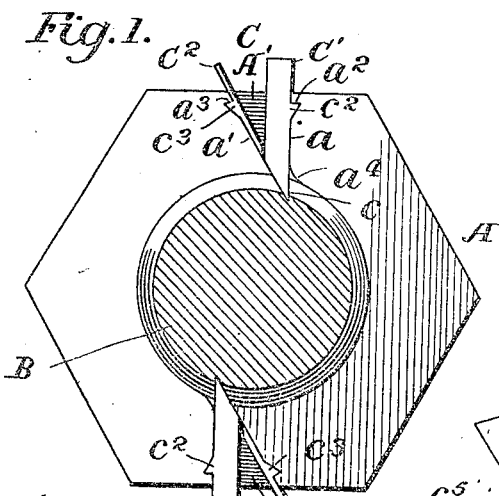
Figure 3A:
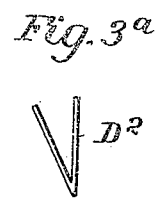
Figure 2:
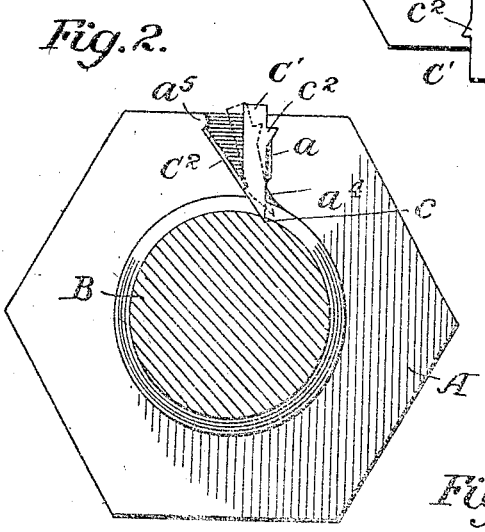
Figure 3:
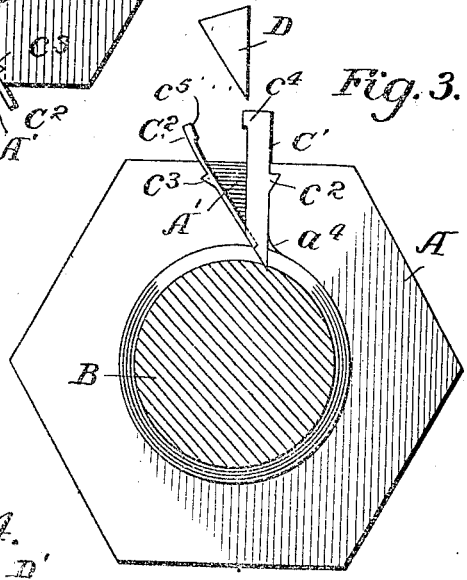
Figure 4:
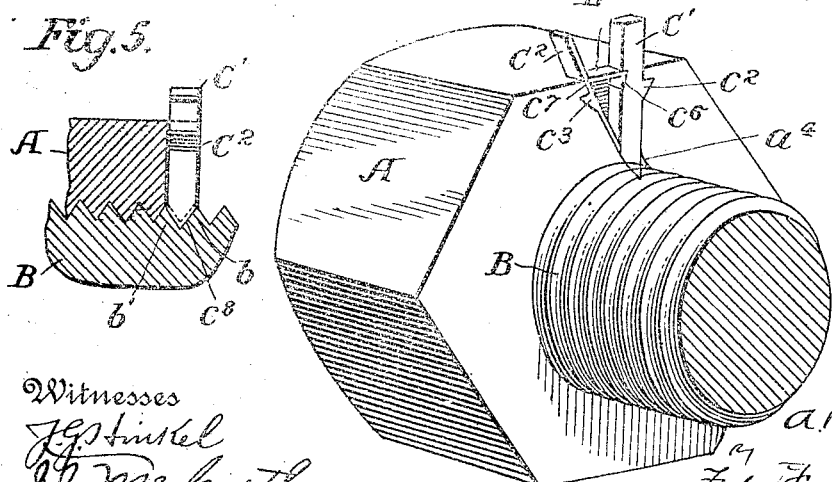
Figures 5, 6:
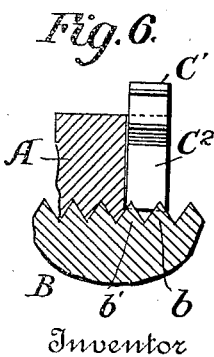

Referring to the accompanying drawings,— Figure 1 is an inner-side view of a nut, and a cross section of a portion of a bolt showing the nut lock in locking position; Fig. 2 is a similar view showing the relative position of the parts as the nut is being tightened; Fig. 3 is a similar view showing a modified construction of the locking key; Fig. 3ª is a detail of a spring wedge; Fig. 4 is a perspective view showing another modification of the invention; Figs. 5 and 6 are sectional details showing different forms of locking keys.

In the accompanying drawings, I have illustrated a preferred embodiment of my invention showing some variations in the details of construction, sufficient to enable those skilled in the art to understand the general principles of construction and mode of operation of the device, and it will be understood that I do not herein limit myself to the precise details shown and described, as they may be varied by those skilled in the art to adapt my invention to various conditions and to meet various requirements, without departing from the general principles thereof.

In the drawings, I have shown a nut of ordinary construction and configuration, and a portion of a bolt, which are typical only, and it will be understood that my nut lock may be applied to any kind of a nut or bolt in connection with which it is capable of being used.

Referring to the drawing, and as a detail description of what is shown therein, A represents the nut, the inner or wearing face of which is provided with a recess or opening A', which, generally speaking, is tangentially arranged with relation to the central opening of the nut, in which are the usual internal screw threads. This opening or recess may be formed in any desired way, and can be molded in forming the nut, or may be cut after the nut is formed, and its exact location can be varied. This recess comprises two sides, or side walls, $a$, $a'$, and these walls are at an angle to each other so that the general contour of the opening or recess is preferably V-shaped, and at the inner portion, the walls are at a slight distance apart, leaving an opening at the bottom of the recess through the thread or threads of the nut.

One of the side walls, as $a$, of the tangential recess is preferably at right angles to the edge of the nut adjacent the inner face wherein the recess is formed, while the other wall $a'$ is inclined to the edge of the nut, thus making the tangential recess generally in the shape of a right angle triangle. These side walls are also preferably provided with some means by which the locking key can be secured in position, and I have shown locking notches $a^2$, $a^3$ in the respective walls. The side wall $a$ is also preferably cut away adjacent the screw thread portion of the nut, as indicated at $a^4$, and this portion makes what may be called a rolling fulcrum for the locking key, the purpose of which will appear hereafter.

The locking key which is generally designated as C may be generally described as V-shaped, and as shown comprises two parts which may be defined as the key proper C' and the retaining spring $C^2$, and these parts may be separate from each other, or may be formed integrally, or the spring arm or part $C^2$ may be separately made and attached to the key portion in any well known way, and it is shown in some of the figures as having its lower end fitted in a recess in the key portion.

The key proper C' is a straight bar and may be of any width or thickness to properly coöperate with the other parts of the device, and its inner end is made chisel-shape so that it has a cutting surface or edge $c$ which is adapted to enter into the material of the bolt B. The locking key is also provided with some means for securing it in place, and while these means may vary, I have shown the key C' as provided with a locking projection $c^2$; and the spring arm or portion $C^2$ is also provided with a locking projection $c^3$, and these projections are adapted to coöperate with the notches $a^2$, $a^3$ in the side walls of the recess in the nut.

In Fig. 2 I have shown a slightly different construction in which the rocking fulcrum $a^4$ is made more prominent, and the side wall $a$ is cut away at its central portion between the notch $a^2$ and the rocking fulcrum, and the spring arm $C^2$ is made to abut against a projection $a^5$ on the wall of the recess.

In Fig. 3 I have shown another modification, wherein like parts are similarly lettered, but in this case the key and spring $C'$ and $C^2$ are extended outside the surface of the nut, and are each provided with an inwardly projecting lug $c^4$, $c^5$ in the projecting portions, and in this construction I provide a wedge D which may be driven into the locking key between the spring and key portion, and be retained by said projections, it being understood that the spring portion $C^2$ will yield sufficiently to permit the wedge being driven into place, and then will resume the position shown in Fig. 3 so that the lugs will engage the wedge and retain it. In Fig. $3^a$ I have shown a spring portion in the form of a wedge $D^2$.

In Fig. 4 I have shown what is practically a wedge in the form of the bar $D'$, which will engage notches or projections $c^6$ and $c^7$ in the adjacent faces of the key and spring and be retained therein.

The locking key, as above indicated, is preferably provided with what I have termed a chisel-form end, and the shape of this may vary. In Figs. 5 and 6 I have illustrated two different shapes. In Fig. 5, the cutting edge $c^8$ is beveled on either side so that the chisel or cutting edge corresponds practically to the thread on the bolt B, so that its edges engage the opposite sides of two adjacent threads $b$, $b'$. The edge of the key is preferably a little wider than the intervening groove between the two threads so that it will enter the material of the sides of the two adjacent threads, as well as enter the material of the body of the bolt at the bottom of the groove between the threads.

In Fig. 6 the key $C'$ is made wider and the chisel-shape edge is wide enough to embrace two threads $b$, $b'$ of the bolt and enter into the material of the threads. Of course, this key can be made wider, but having shown it so as to engage a plurality of threads, it is not deemed necessary to show other modifications of this particular feature of construction.

Having thus particularly described the various features of construction illustrated in the drawing, the mode of assembling the parts and their operation will be largely understood by what has been stated above. In applying the nut to the bolt, it will be understood that it can be screwed to the position desired, and then the locking key C can be placed in position in the recess, and forced or driven into locking position in any suitable manner. In doing this, it will be observed that the chisel or cutting end of the key will be forced into the material of the bolt B to a greater or less extent, and when the locking key has reached its final position, the spring arm will cause the locking projections $c^2$, $c^3$ to engage the locking notches $a^2$, $a^3$ in the walls of the recess, and the key is then securely locked and will be held with its chisel end in engagement with the threads or body of the bolt. The locking key can further be secured in position, and this is specially desirable in connection with large nuts, by the use of the wedge D, D' or $D^2$ which can be forced or driven into position, indicated in Figs. 3 and 4, and the parts further secured in place by the wedge engaging the inwardly extending lugs or corresponding notches in the key and spring. When the parts are thus arranged, it will be observed that any tendency toward unscrewing the nut will be resisted by the cutting edge of the locking key, which is embedded in or engages the threads or body of the bolt, and the nut can only be turned in this direction against this resistance of the material of the bolt, and thus the nut is securely held against any tendency to be turned in this direction.

If, perchance, the parts confined by the bolt and nut, or the parts themselves become loosened, and it is desired to tighten the nut upon the bolt when the locking key is in the form shown in Figs. 1 and 2, or any equivalent thereof, it will be observed that the nut can be turned toward the left, as viewed in the drawing, and then the key $C'$ will rock upon the rolling fulcrum $a^4$ withdrawing the locking projection $c^2$ from the locking notch $a^2$ and the cutting edge $c$ will move out of its position in the threads or body of the bolt and into the space between them and the surface of the rolling fulcrum, and thus the cutting edge of the locking key will ride or move over the surface of the threads of the bolt until the nut has been turned to its tightened position, when the locking key can again be forced or driven into its locking position and the nut become again locked.

It will be observed that in forcing the locking key into the material of the bolt, owing to its peculiar shape, it sometimes tends to raise the material of the threads slightly above their ordinary contour on the straight side of the chisel, but when the nut is tightened in the manner above described, the internal threads of the nut tend to restore this upset material to its normal position and cure or fill the cut made by the key, and thus prevent any permanent injury to the threads of the bolt.

When it is desired to remove the nut, the locking key can first be removed in any suitable way, and if, for instance, it is used in the form shown in Figs. 3 and 4, it will first be necessary to remove the wedge D, or D', and this can be done, in the form shown in Fig. 3, by bending the projecting end of the spring portion C² sufficiently to relieve the wedge from the inwardly extending lugs $c^4$, $c^5$.

In the form shown in Fig. 4, the end of the wedge D' adjacent the key C' can be forced down the incline below the lug $c^6$ and then removed. The spring arm C² can then be pressed toward the key C' withdrawing the locking lugs from the locking notches, and the key removed.

In some instances, it is desirable to provide more than one locking key to each nut, and in Fig. 1, I have shown a plurality of tangential notches and keys engaging the opposite sides of the bolt.

What I claim is,—

1. In a nut lock, a nut having a tangential recess in its inner face, the side walls of the recess being provided with locking notches, and a rocking fulcrum.

2. In a nut lock, a V-shaped locking key comprising a key portion and spring portion connected together, having locking projections and inwardly extending locking lugs.

3. In a nut lock, the combination with the locking key comprising a key portion and a spring portion having inwardly extending locking lugs, of a wedge adapted to engage the key and spring portions and be secured therein.

4. In a lock nut, the combination with a nut having a tangential recess in its inner face, one of the walls of the recess being provided with a rocking fulcrum, of a locking key having a chisel-shaped end fitting said recess and bearing on said rocking fulcrum.

5. In a nut lock, the combination with a nut having a tangential recess in its inner face, one of the walls of which is provided with a locking notch and a rocking fulcrum, of a locking key comprising a key portion and a spring portion connected together and having a locking projection to engage said locking notch.

In testimony whereof I affix my signature in presence of two witnesses.

AHIJAH R. BYRKETT.

Witnesses:
FRANK L. FREEMAN,
JOHN J. McCARTHY.